United States Patent
Watanabe (10) Patent No.: US 9,608,736 B2
(45) Date of Patent: Mar. 28, 2017

(54) PLANAR LIGHTWAVE CIRCUIT AND OPTICAL RECEIVER

(75) Inventor: Shinya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 376 days.

(21) Appl. No.: 14/348,301

(22) PCT Filed: Sep. 13, 2012

(86) PCT No.: PCT/JP2012/074132
§ 371 (c)(1),
(2), (4) Date: Mar. 28, 2014

(87) PCT Pub. No.: WO2013/047333
PCT Pub. Date: Apr. 4, 2013

(65) Prior Publication Data
US 2014/0212137 A1 Jul. 31, 2014

(30) Foreign Application Priority Data
Sep. 29, 2011 (JP) .................................. 2011-214483

(51) Int. Cl.
*H04B 10/06* (2006.01)
*G02F 2/00* (2006.01)
(Continued)

(52) U.S. Cl.
CPC ......... *H04B 10/697* (2013.01); *G02B 6/4215* (2013.01); *H04B 10/615* (2013.01); *H04J 14/06* (2013.01); *G02B 6/2773* (2013.01)

(58) Field of Classification Search
CPC .. G02B 6/2773; G02B 6/4215; H04B 10/615; H04B 10/697; H04J 14/06
(Continued)

(56) References Cited

U.S. PATENT DOCUMENTS

| 9,281,901 B2* | 3/2016 | Yamazaki | H04B 10/61 |
| 2003/0021550 A1* | 1/2003 | Korenaga | G02B 6/12004 |
| | | | 385/88 |

(Continued)

FOREIGN PATENT DOCUMENTS

| JP | 03-033726 | 2/1991 |
| JP | 7-15386 | 1/1995 |

(Continued)

OTHER PUBLICATIONS

Hashimoto et al., "Dual polarization optical hybrid module using planar lightwave circuit", Electronics Society Conference, The Institute of Electronics, Information and Communication Engineers, 2009.

(Continued)

*Primary Examiner* — Ken N Vanderpuye
*Assistant Examiner* — Amritbir Sandhu
(74) *Attorney, Agent, or Firm* — Finnegan, Henderson, Farabow, Garrett & Dunner, L.L.P.

(57) ABSTRACT

A planar lightwave circuit and an optical receiver which reduce degradation in signal quality is provided.

A planar lightwave circuit includes: a substrate with a straight groove formed therein; a signal light input port which is formed in the substrate and receives signal light; a first planar filter part which is fitted into the groove and separates the signal light into a signal light component including a first polarization state and that including a second polarization state; a second planar filter part which is fitted into the groove and separates the local oscillator light into a local oscillator light component including the first polarization state and that including the second polarization state; a first interference part formed in the substrate; a second interference part which is formed on a side of the substrate opposite to the side of the first interference part (Continued)

across the groove; a first waveguide which is connected to the signal light input port and also to a reflection surface of the first planar filter part; a second and a third waveguide; a fourth waveguide which is connected to the local oscillator light input port and also to a reflection surface of the second planar filter part; and a fifth and a sixth waveguide.

10 Claims, 5 Drawing Sheets (51) Int. Cl.
*H04B 10/69* (2013.01)
*G02B 6/42* (2006.01)
*H04J 14/06* (2006.01)
*H04B 10/61* (2013.01)
*G02B 6/27* (2006.01)

(58) Field of Classification Search
USPC .......................................................... 359/325
See application file for complete search history.

(56) References Cited

U.S. PATENT DOCUMENTS

| | | | |
|---|---|---|---|
| 2009/0074428 A1 | 3/2009 | Liu | |
| 2010/0014802 A1* | 1/2010 | Chapman | G02B 6/125 385/11 |
| 2010/0092168 A1 | 4/2010 | Li et al. | |
| 2010/0178056 A1* | 7/2010 | Liu | H04B 10/61 398/65 |
| 2011/0243556 A1* | 10/2011 | Nagarajan | H04B 10/40 398/43 |
| 2012/0183254 A1* | 7/2012 | Inoue | G02B 6/125 385/14 |
| 2012/0207474 A1* | 8/2012 | Inoue | H04B 10/60 398/65 |
| 2012/0224812 A1* | 9/2012 | Inoue | G02B 6/125 385/42 |
| 2013/0039662 A1* | 2/2013 | Brooks | G02B 6/12007 398/91 |
| 2013/0170843 A1* | 7/2013 | Baney | H04B 10/61 398/212 |
| 2014/0023359 A1* | 1/2014 | Tsubouchi | H04B 10/0799 398/24 |
| 2014/0086595 A1* | 3/2014 | Yamazaki | G02B 6/125 398/214 |
| 2015/0049984 A1* | 2/2015 | Kato | |
| 2015/0078749 A1* | 3/2015 | Yamazaki | H04B 10/61 398/65 |
| 2015/0318952 A1* | 11/2015 | Butrie | H04J 14/06 398/65 |
| 2016/0033728 A1* | 2/2016 | Kish, Jr. | G02B 6/272 385/14 |
| 2016/0149662 A1* | 5/2016 | Soldano | G02B 6/30 398/51 |

FOREIGN PATENT DOCUMENTS

| | | |
|---|---|---|
| JP | 2010-081611 | 4/2010 |
| JP | 2010-539789 | 12/2010 |
| JP | 2011-076049 | 4/2011 |

OTHER PUBLICATIONS

A. Beling et al., "Fully-Integrated Polarization-Diversity Coherent Receiver Module for 100G DP-QPSK", Optical Fiber Communication Conference and Exposition, Optical Society of America, 2011.
International Search Report and Written Opinion mailed Jan. 22, 2013.
T. Ohyama et al., "All-in-one 100-Gbit/s DP-QPSK Coherent Receiver using Novel PLC-based Integration Structure with Loss-loss and Wide-tolerance Multi-channel Optical Coupling",OECC 2010 Technical DIgest, PD6, Jul. 2010.
Office Action mailed Feb. 10, 2015 by the Japanese Patent Office in counterpart Japanese Patent Application No. 2013-536215.

* cited by examiner

PLANAR LIGHTWAVE CIRCUIT AND OPTICAL RECEIVER

CROSS-REFERENCE TO RELATED PATENT APPLICATIONS

This application is a National Stage Entry of International Application No. PCT/JP2012/074132, filed Sep. 13, 2012, which claims priority from Japanese Patent Application No. 2011-214483, filed Sep. 9, 2011. The entire contents of the above-referenced applications are expressly incorporated herein by reference.

TECHNICAL FIELD

The present invention relates to a planar lightwave circuit and an optical receiver for receiving polarization-multiplexed optical signals.

BACKGROUND ART

With the recent explosive increase in network traffic, ultra-high-speed optical transmission systems of 40 Gbit/s, beyond 100 Gbit/s have been investigated. For such ultra-high-speed optical transmission systems, active investigation has been conducted on digital coherent communication combining a phase modulation method with coherent detection and digital signal processing technology, which is superior in characteristics required for long haul optical fiber transmission, such as tolerance characteristics against optical signal noise, chromatic dispersion, and polarization mode dispersion.

As a modulation method, Binary Phase Shift Keying (BPSK) and Quadrature Phase Shift Keying (QPSK) have attracted attention because of their excellent dispersion compensation tolerance.

Further, in order to expand transmission capacity without increase in the frequency bandwidth, research and development have been extensively conducted toward the practical use on a method which is superior in frequency usage efficiency, such as Dual-Polarization Quadrature Phase Shift Keying (DP-QPSK) in which QPSK signals are multiplexed by two orthogonal polarizations.

Figure 9:
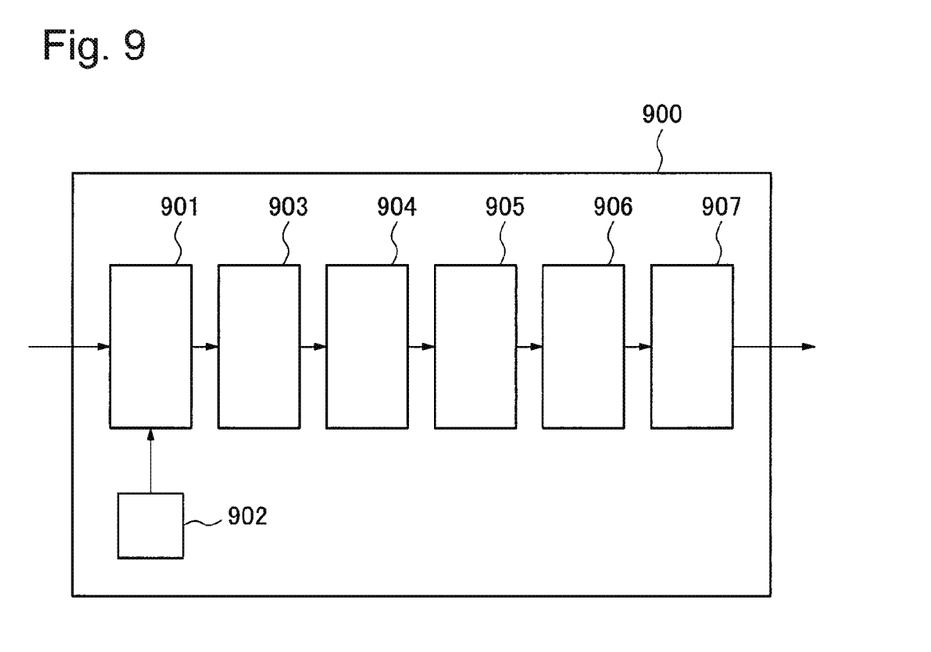
FIG. 9 is a functional block diagram of an optical receiver related to the present invention.

An optical receiver for digital coherent communication will be described below. The present description will be given using the QPSK method as an example. FIG. 9 is a functional block diagram of an optical receiver related to the present invention. With reference to this functional block diagram, a reception process in digital coherent communication will be described.

First, an optical receiver 900 receives a polarization-multiplexed optical signal. A polarization separation section 901 separates the received optical signal into an optical signal component having a first polarization state and that with a second polarization state perpendicular to the first polarization. The optical receiver 900 includes a local oscillator light source 902 which outputs local oscillator light with almost the same frequency as the optical frequency of the received optical signal. The separated two optical signal components and the local oscillator light are inputted into a 90-degree optical hybrid 903. The 90-degree optical hybrid 903 outputs a total of four optical signals including of real and imaginary components of each signal light component, which has polarization state parallel to respective one of two orthogonal polarization axes. The four optical signals are converted by an optical detector 904 into analog electrical signals, and are subsequently converted by an analog-to-digital converter 905 into digital electrical signals. These digital electrical signals are transformed by a re-sampling unit, which is not illustrated in the drawing, into digital electrical signals sampled at the symbol rate (also referred to as a baud rate) of the optical signals, and are subsequently inputted into a digital signal processing unit 906. The digital signal processing unit 906 has functions of wavelength dispersion compensation, polarization chromatic compensation, and phase noise and frequency deviation compensation. For example, as compensation for optical carrier wave frequency deviation and optical phase deviation, compensation is performed on a frequency deviation between the received optical signal and the local oscillator light and on an optical phase rotation due to a phase deviation, respectively. After that, each of the electrical signals is demodulated by a symbol discrimination unit 907 into a bit string sent by an optical transmitter. In this way, digital coherent detection in an ultra-high-speed optical communication system is realized.

Hereinafter, a description will be given in more detail of the above-mentioned polarization separation section and 90-degree optical hybrid. For convenience, a functional block having at least both functions of the polarization separation section and the 90-degree optical hybrid is referred to as an optical receiving unit. With regard to such an optical receiving unit, a study on its standardization has been conducted in the OIF (Optical Internetworking Forum), which is an industry organization for promoting high-speed data communication, and development of an optical receiving unit following the standard has been carried out.

There are various kinds of means for realizing such an optical receiving unit. For example, Non-patent Literature 1 describes an example of realizing an optical receiving unit with a combination of bulk elements. However, when thus realizing an optical receiving unit with a combination of bulk elements, it is difficult to adjust positional relationships between a plurality of bulk elements. It is because the adjustment requires, for example, that the optical axes of the plurality of bulk elements are aligned with each other. Consequently, a planar lightwave circuit is considered to be promising as a means without requiring such adjustment of positional relationships. For example, Non-patent Literature 2 discloses an example of realization of an optical receiving unit using a planar lightwave circuit. A part referred to as a PBS in Non-patent Literature 2 corresponds to the polarization separation section. A part referred to as a 90-OH corresponds to the 90-degree optical hybrid. The PBS described in Non-patent Literature 2 outputs light beams with different polarization states at different ports, by adjusting the birefringence of the arms constituting the PBS and thereby providing a phase difference π between the polarization states. By this way, good transmission characteristics are obtained, and polarization separation is accordingly realized.

However, this method requires highly precise adjustment of the birefringence of the arms constituting the PBS. To realize such highly precise birefringence adjustment, it is necessary to control the birefringence of the arms by using UV or heat. Accordingly, the process of controlling the birefringence becomes complicated, and it is difficult to reduce the cost.

Patent Literature 1 discloses an example of a configuration in which the complexity of the process of controlling the birefringence is resolved. In Patent Literature 1, disclosed is a configuration in which a groove is formed at a part of a planar lightwave circuit, and a photonic crystal chip is inserted in the groove in a manner to intersect a waveguide so as to enable the photonic crystal chip to function. With this configuration, a polarization separation function can be realized without the need for the process of controlling birefringence.

CITATION LIST

Patent Literature

Patent literature 1: Japanese Patent Application Laid-Open No. 2011-76049

Non-Patent Literature

Non-patent literature 1: "Fully-Integrated Polarization-Diversity Coherent Receiver Module for 100G DP-QPSK," in Optical Fiber Communication Conference, OSA Technical Digest (CD) (Optical Society of America, 2011), paper OML5.

Non-patent literature 2: "Dual polarization optical hybrid module using planar lightwave circuit," 2009 Electronics Society Conference, The Institute of Electronics, Information and Communication Engineers.

DISCLOSURE OF INVENTION

Problem to be Solved by the Invention

However, for example, in the configuration of Patent Literature 1, as disclosed in FIG. 1 of Patent Literature 1, waveguides for signal light and waveguides for local oscillator light intersect with each other at many points. Accordingly, at the points of intersection between the waveguides or in their vicinity, leakage light or stray light from one waveguide generates crosstalk from the waveguide to the other one. Influence of such crosstalk on signal quality is particularly large in coherent detection. For this reason, the configuration of Patent Literature 1 has a problem in that the intersection between a plurality of waveguides at many points causes degradation in signal quality.

In this respect, the present invention has been made in view of the above-mentioned problem, and accordingly its objective is to provide a planar lightwave circuit and an optical receiver which can reduce degradation in signal quality.

Means for Solving a Problem

A planar lightwave circuit of the present invention includes: a substrate with a straight groove formed therein; a signal light input port which is formed in the substrate and receives polarization-multiplexed signal light; a local oscillator light input port which is formed in the substrate and receives polarization-multiplexed local oscillator light; a first planar filter part which is fitted into the groove and separates the signal light into a signal light component including a first polarization state and that including a second polarization state; a second planar filter part which is fitted into the groove and separates the local oscillator light into a local oscillator light component including the first polarization state and that including the second polarization state; a first interference part formed in the substrate; a second interference part which is formed on a side of the substrate opposite to the side of the first interference part across the groove; a first waveguide which is connected to the signal light input port and connected diagonally to a reflection surface of the first planar filter part; a second waveguide which is connected to the first interference part and to the first planar filter part, and guides the signal light component including the first polarization state; a third waveguide which is connected to the second interference part and to the first planar filter part, and guides the signal light component including the second polarization state; a fourth waveguide which is connected to the local oscillator light input port and connected diagonally to a reflection surface of the second planar filter part; a fifth waveguide which is connected to the first interference part and to the second planar filter part, and guides the local oscillator light component including the first polarization state; and a sixth waveguide which is connected to the second interference part and to the second planar filter part, and guides the local oscillator light component including the second polarization state.

Another planar lightwave circuit of the present invention includes: a substrate with a straight groove formed therein; a signal light input port which is formed in the substrate and receives polarization-multiplexed signal light; a first and a second local oscillator light input port which are formed in the substrate and each receive local oscillator light of a single polarization state; a planar filter part which is fitted into the groove and separates the signal light into a signal light component including a first polarization state and that including a second polarization state; a first interference part formed in the substrate; a second interference part which is formed on a side of the substrate opposite to the side of the first interference part across the groove; a first waveguide which is connected to the signal light input port and also connected diagonally to a reflection surface of the planar filter part; a second waveguide which is connected to the first interference part and to the planar filter part, and guides the signal light component including the first polarization state; a third waveguide which is connected to the second interference part and to the planar filter part, and guides the signal light component including the second polarization state; a fourth waveguide which is connected to the first local oscillator light input port and the first interference part, and guides the local oscillator light of a single polarization state; a fifth waveguide which is connected to the second local oscillator light input port and the second interference part, and guides the local oscillator light of a single polarization state; and a polarization switching part which is provided in one of the third and fifth waveguides, and switches the polarization of entering light.

Still another planar lightwave circuit of the present invention includes: a substrate with a straight groove formed therein; a signal light input port which is formed in the substrate and receives polarization-multiplexed signal light; a local oscillator light input port which is formed in the substrate and receives local oscillator light of a single polarization state; a planar filter part which is fitted into the groove and separates the signal light into a signal light component including a first polarization state and that including a second polarization state; a first interference part formed in the substrate; a second interference part which is formed on a side of the substrate opposite to the side of the first interference part across the groove; a splitting part which splits input light; a first waveguide which is connected to the signal light input port and also connected diagonally to a reflection surface of the planar filter part; a second waveguide which is connected to the first interference part and to the planar filter part, and guides the signal light component including the first polarization state; a third waveguide which is connected to the second interference part and to the planar filter part, and guides the signal light component including the second polarization state; a fourth waveguide which is connected to the local oscillator light input port and to the splitting part, and guides the local oscillator light of a single polarization state; a fifth waveguide which is connected to the splitting part and to the first interference part, and guides the local oscillator light of a single polarization state; a sixth waveguide which is connected to the splitting part and to the second interference part, and guides the local oscillator light of a single polarization state; and a polarization switching part which is provided in either of the third and sixth waveguides, and switches the polarization of entering light.

An optical receiver of the present invention includes: a planar lightwave circuit which separates polarization-multiplexed signal light in terms of polarization and makes polarization-separated signal light components interfere with local oscillator light; a photoelectric conversion unit which converts interference light outputted from the planar lightwave circuit into an electrical signal; an analog-to-digital conversion unit which converts the electrical signal into a digital signal; and a digital signal processing unit which processes the digital signal; wherein the planar lightwave circuit includes: a substrate with a straight groove formed therein; a signal light input port which is formed in the substrate and receives polarization-multiplexed signal light; a local oscillator light input port which is formed in the substrate and receives polarization-multiplexed local oscillator light; a first planar filter part which is fitted into the groove and separates the signal light into a signal light component including a first polarization state and that including a second polarization state; a second planar filter part which is fitted into the groove and separates the local oscillator light into a local oscillator light component including the first polarization state and that including the second polarization state; a first interference part formed in the substrate; a second interference part which is formed on a side of the substrate opposite to the side of the first interference part across the groove; a first waveguide which is connected to the signal light input port and also connected diagonally to a reflection surface of the first planar filter part; a second waveguide which is connected to the first interference part and to the first planar filter part, and guides the signal light component including the first polarization state; a third waveguide which is connected to the second interference part and to the first planar filter part, and guides the signal light component including the second polarization state; a fourth waveguide which is connected to the local oscillator light input port and also connected diagonally to a reflection surface of the second planar filter part; a fifth waveguide which is connected to the first interference part and to the second planar filter part, and guides the local oscillator light component including the first polarization state; and a sixth waveguide which is connected to the second interference part and to the second planar filter part, and guides the local oscillator light component including the second polarization state.

Effect of the Invention

According to the present invention, it becomes possible to provide a planar lightwave circuit and an optical receiver which reduce degradation in signal quality.

DESCRIPTION OF EMBODIMENTS

Hereinafter, exemplary embodiments of the present invention will be described with reference to drawings.

Figure 1:
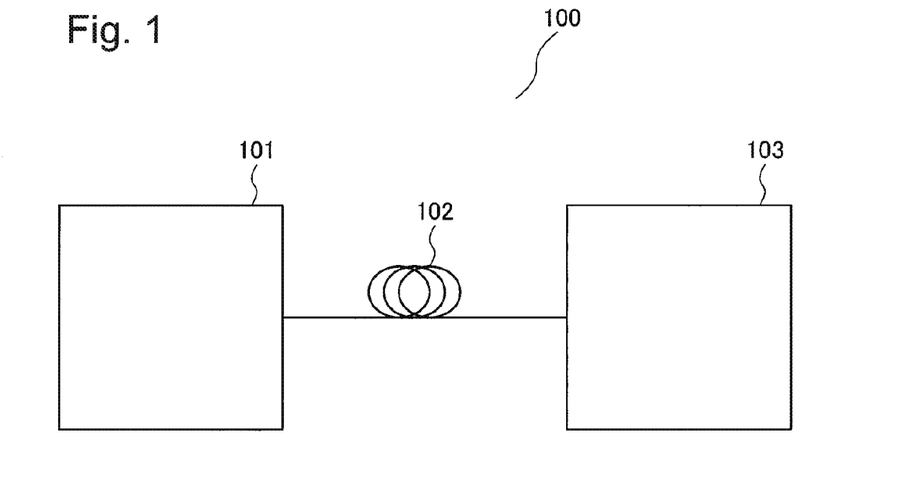
FIG. 1 is a functional block diagram of the optical transmission system 100 according to the exemplary embodiment of the present invention.

FIG. 1 is a functional block diagram of an optical transmission system 100 according to an exemplary embodiment of the present invention. The optical transmission system 100 includes an optical transmitter 101 which sends an optical signal modulated by polarization-multiplexed M-level phase shift keying (M is an integer equal to or larger than two), a transmission line 102 which transmits the optical signal sent from the optical transmitter 101, and an optical receiver 103 which receives the optical signal via the transmission line 102. Although M-level phase shift keying is used as an example in the present description, Amplitude Phase Shift Keying (APSK) and M-level Quadrature Amplitude Modulation (QAM) may also be used. Orthogonal Frequency Division Multiplexing (OFDM) may be employed as a transmission method, and polarization-multiplexed M-level phase shift keying or the like may be employed for at least one of the subcarriers. In the present exemplary embodiment, the optical transmission system 100 includes one optical transmitter 101 and one optical receiver 103, but it may include more than one units of each of them.

For the transmission line 102, a single mode optical fiber and a multimode optical fiber may be used.

Figure 2:
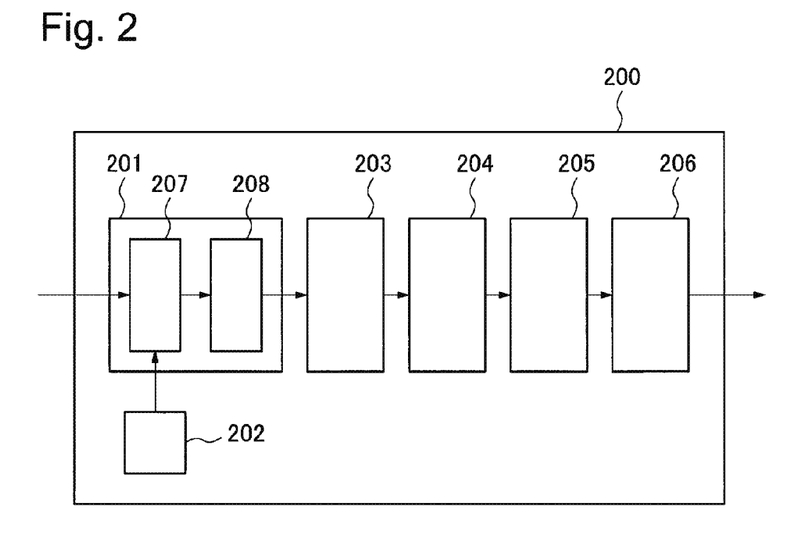
FIG. 2 is a functional block diagram of the optical receiver 103 according to the exemplary embodiment of the present invention.

The optical receiver 103 demodulates the signal light and outputs the demodulated data to the outside. An example of a configuration of the optical receiver will be described below using a figure. FIG. 2 is a functional block diagram of the optical receiver 103 according to the exemplary embodiment of the present invention. The present description will be given about demodulation using digital signal processing as an example.

An optical receiver 200 includes an optical receiving unit 201, a local oscillator light source 202, a photoelectric conversion unit 203, an analog-to-digital converter 204, a digital signal processing unit 205 and a demodulation unit 206. Further, the optical receiving unit 201 includes a polarization separation section 207 and an interference section 208.

The polarization separation section 207 separates signal light received via the transmission line 102 into a signal light component with a first polarization state and that with a second polarization state. It may also separate the local oscillator light from the local oscillator light source 202 into a local oscillator light component with the first polarization state and that with the second polarization state. Waves with the first and second polarization states may be referred to as a TM (Transverse Magnetic) wave or a TE (Transverse Electric) wave. They may be also referred to as a vertically polarized wave or a horizontally polarized wave.

The interference unit 208 causes the polarization-separated signal light to interfere with local oscillator light from the local oscillator light source 202, and outputs the interference light to the photoelectric conversion unit 203.

The local oscillator light source 202 may be provided outside the optical receiver 103. In that case, the optical receiver 103 includes a local oscillator light input port which receives local oscillator light from the local oscillator light source 202.

The photoelectric conversion unit 203 converts the interference light into an electrical signal and outputs the converted electric signal to the analog-to-digital converter 204.

The analog-to-digital converter 204 converts the electrical signal after the conversion, which is an analog signal, into a digital signal.

From the digital signal, the digital signal processing unit 205 extracts information about the phase and intensity of the signal light. The digital signal processing unit 205 has, for example, functions of chromatic dispersion compensation, polarization dispersion compensation, and phase noise and frequency deviation compensation.

On the basis of the information about the phase and intensity of the signal light extracted by the digital signal processing unit 205, the demodulation unit 206 demodulate a bit string sent by the transmitter 101.

Although one example of signal processing by the optical receiver 103 has been shown here, various known means may be employed for the signal processing in stages following the optical receiving unit 201.

Figure 3:
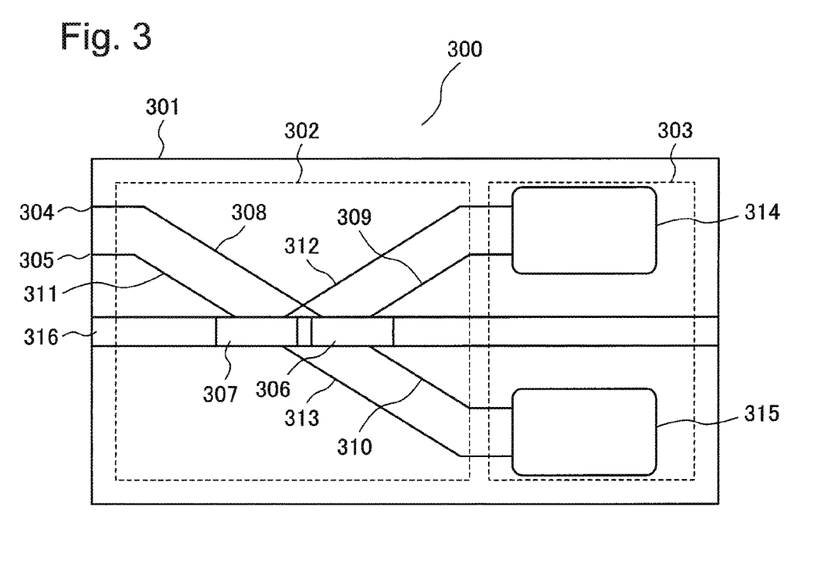
FIG. 3 is an example of a configuration of the planar lightwave circuit according to the exemplary embodiment of the present invention.

Next, the optical receiving unit 201 will be described in more detail, using a figure. FIG. 3 is a configuration of a planar lightwave circuit, which is an example of the optical receiving unit 201.

A planar lightwave circuit 300 includes a substrate 301, a polarization separation section 302, an interference section 303, a signal light input port 304 and a local oscillator light input port 305. Further, the polarization separation section 302 includes a first and a second planar filter part 306 and 307, and first to sixth waveguides 308, 309, 310, 311, 312 and 313. The interference section 303 includes a first and a second interference part 314 and 315.

A straight groove 316 is formed in the substrate 301. As the material of the substrate 301, silica glass is used, for example. As shown in FIG. 3, for example, the groove 316 may be formed straightly from one end of the substrate 301 to the other end. The groove 316 may also be formed only in a portion of the substrate 301, and it is only necessary to be large enough for the first and second planar filter parts 306 and 307 to fit inside. The groove 316 described above may be fabricated by a dicing process, for example. Here, the word "straightly" is used to express a state including a bend or the like depending on the accuracy of a fabrication method of the groove 316, and is not intended to express a perfect straight line.

The signal light input port 304 receives polarization-multiplexed signal light. More specifically, a polarization-multiplexed signal sent from the optical transmitter 101 via the transmission line 102 is inputted into the signal light input port 304.

The local oscillator light input port 305 receives polarization-multiplexed local oscillator light. For example, if the local oscillator light source 202 outputs local oscillator light with a first polarization state, the local oscillator light with the first polarization state is inputted into the local oscillator light input port 305 such that the polarization plane of the local oscillator light has a predetermined angle to a polarization plane determined by the second planar filter part 307. As a result, the polarization-multiplexed local oscillator light is inputted into the local oscillator light input port 305 with reference to the polarization plane determined by the second planar filter part 307.

The first planar filter part 306 is fitted into the groove 316, and separates the signal light into a signal light component including a first polarization state and that including a second polarization state. The second planar filter part 307 is also fitted into the groove 316, and separates the local oscillator light into a local oscillator light component including the first polarization state and that including the second polarization state. Here, the distance from one end of the groove 316 to the first planar filter part 306 is different from that from the same end of the groove 316 to the second planar filter part 307.

Figure 8:
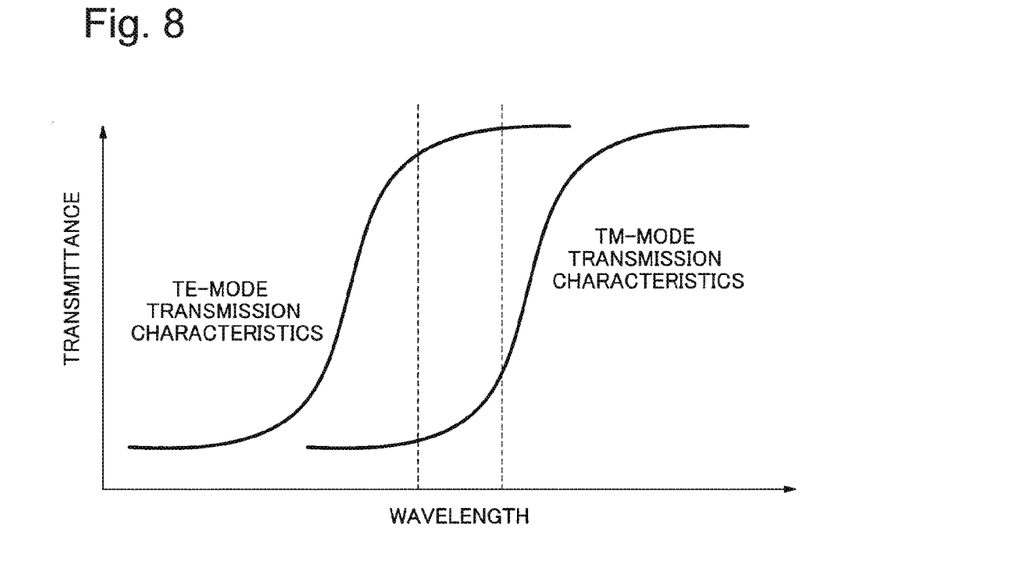
FIG. 8 is an example of transmission spectra of a planar filter part.

Characteristics of the first and second planar filter parts 306 and 307 will be described first. Hereafter, unless otherwise mentioned, the first and second planar filter parts 306 and 307 are collectively referred to as a planar filter part. The planar filter part exhibits different transmittance for each polarization state of incoming light. More specifically, depending on the material or configuration of the planar filter part, the incident angle of incident light, or its wavelength, the planar filter part has a different transmittance for each polarization state. An example of a transmission spectrum of such a planar filter part is shown in FIG. 8. This example is a transmission spectrum for a case where a dielectric multilayer filter, which will be described below, is used as the planar filter part. Here, the transmission spectrum means a relationship between the wavelength of light entering the planar filter part and its transmittance. The horizontal axis of FIG. 8 represents the wavelength of light entering the planar filter part, and the vertical axis does the transmittance. One curve represents a transmission spectrum of the planar filter part for a TE wave, and the other curve does that for a TM wave. The TM wave is an electromagnetic wave with its electric field component oscillating in the direction perpendicular to the surface of the planar lightwave circuit 300, and the TE wave is an electromagnetic wave with its electric field component oscillating on the surface of the planar lightwave circuit 300 in the direction perpendicular to the propagation direction of the electromagnetic wave. For example, if the light with a wavelength in the range between the dotted lines shown in FIG. 8 is entered into the planar filter part, a TE wave is dominantly included in transmitted light, and a TM wave mainly in reflected light.

By employing a photonic crystal polarizer as the material of the planar filter part, which will be described below, the first and second polarization states can be set to correspond to TE and TM waves, respectively. The correlation may also be reversed.

As seen from the graphs of FIG. 8, each of transmitted light and reflected light has mainly either of the two polarization states. Each of transmitted light and reflected light each does not have only either of the two polarization states, but can include both. Accordingly, transmitted light including the first polarization state mainly includes the first polarization state and also, to some extent, the second polarization state. It is much the same for reflected light including the second polarization state.

Materials of the planar filter part described above include a dielectric multilayer filter and a photonic crystal polarizer, for example. A dielectric multilayer filter can be produced by laminating a plurality of films having different transmittance values and thicknesses. A photonic crystal polarizer can be produced by alternately laminating a low transmittance crystal such as $SiO_2$ and a high transmittance crystal such as Ge or other semiconductors, $TiO_2$ or other oxides, and nitrides. The material and configuration of the planar filter part is not limited to the above-described ones, and it is only necessary for the planar filter part to exhibit different transmittance for each polarization state.

It is preferable that the material of the first planar filter part 306 is changed depending on the wavelength band of signal light entering the first planar filter part 306. Also preferably, the material of the first planar filter part 306 may be changed depending on the wavelength band of signal light entering the first planar filter part 306 and also on an angle at which the first waveguide 308 is connected to the first planar filter part 306. Also preferably, the configuration of the first planar filter part 306 may be changed instead of changing the material. It is much the same for preferable changes of the second planar filter part 307.

Next, the shape of the planar filter part will be described. It is only necessary for the planar filter part to have a finite thickness in the incident direction of signal light or local oscillator light. It is only necessary for a reflection surface at which signal light or local oscillator light enters the planar filter part to have an area almost equal to or larger than the irradiation area of the signal light. The shape of such a reflection surface may be quadrilateral, and may also be made circular.

A further description will be given below of surfaces of the planar filter part. It is desirable that at least a reflection surface is flat among all surfaces of the planar filter part. Here, "flat" means having a flatness such as unevenness of the reflection surface becomes smaller than the wavelength of incident light. It is because flattening the reflection surface prevents the reflected light from reflecting diffusely, fixes the direction of signal light and local oscillator light reflected at the planar filter part, and reduces a decrease in the signal intensity.

More preferably, among all surfaces of the planar filter part, a surface on the side opposite to the reflection surface is also made flat. Here, the surface on the side opposite to the reflection surface represents a surface through which the light having entered through the reflection surface and having passed through the planar filter part is transmitted to the outside. The reason is that flattening the surface prevents diffusion of signal light and local oscillator light from occurring when the light passing through the planar filter part is transmitted to the outside of the planar filter part, and fixes the direction of the signal light and local oscillator light having passed through the planar filter part, and reduces a decrease in the signal intensity.

The first interference part 314 is formed on the substrate 301. The second interference part 315 is formed on a side of the substrate 301 opposite to the first interference part 314 across the groove 316. The first interference part 314 causes interference between signal light and local oscillator light guided by the second and fifth waveguides 309 and 312. The second interference part 315 causes interference between signal light and local oscillator light guided by the third and sixth waveguides 309 and 312. Here, the first interference part 314 may be formed on either side of the substrate 301 with respect to the groove 316. That is, the positions of the first and second interference parts 314 and 315 shown in FIG. 3 may be reversed with each other.

Preferably, each of the first and second interference parts 314 and 315 is a 90-degree optical hybrid. The 90-degree optical hybrid extracts the real and imaginary components of input signal light by making the signal light interfere with local oscillator light. Accordingly, the 90-degree optical hybrid outputs interference light corresponding to the extracted real component and that corresponding to the imaginary component to the outside. In this way, by employing the 90-degree optical hybrids and forming the polarization separation section 302 and the interference section 303 together, the size of the optical receiving unit 300 including the polarization separation section 302 and the interference unit 303 can be made small.

The first waveguide 308 is connected to the signal light input port 304 and also diagonally to the reflection surface of the first planar filter part 306. Accordingly, the first waveguide 308 guides signal light received at the signal light input port 304 via the transmission line 102 to the first planar filter part 306. Here, the first waveguide 308 is connected to the first planar filter part 306 at a non-right angle with respect to the reflection surface of the first planar filter part 306. This presents the reflected light from propagating backward into the first waveguide 308. As a result, a waveguide for guiding reflected light can be simplified. The reflection surface described above is a surface facing a side surface of the groove 316 among all surfaces of the first planar filter part 306.

The second waveguide 309 is connected to the first interference part 314 and to the first planar filter part 306, and guides the signal light component including the first polarization state.

The third waveguide 310 is connected to the second interference part 315 and to the first planar filter part 306, and guides the signal light component including the second polarization state.

The fourth waveguide 311 is connected to the local oscillator light input port 305 and diagonally to the reflection surface of the second planar filter part 307. And the fourth waveguide 311 guides local oscillator light received at the local oscillator light input port 305 to the second planar filter part 307. Similarly to the first waveguide 308, the fourth waveguide 311 is connected to the second planar filter part 307 at a non-right angle with respect to the reflection surface of the second planar filter part 307.

The angle at which the first waveguide 308 is connected to the first planar filter part 306 can be different from or the same as the angle at which the fourth waveguide 311 is connected to the second planar filter part 307.

A more detail description will be given of the angle at which the first waveguide 308 is connected to the first planar filter part 306. Preferably, the first waveguide 308 is connected to the first planar filter part 306 at an angle determined depending on the wavelength range of signal light entering the first planar filter part 306. More specifically, the first waveguide 308 is connected to the first planar filter part 306 at an angle determined depending on the wavelength range of signal light entering the first planar filter part 306 and also on the transmission spectrum of the first planar filter part 306. When the material of the first planar filter part 306 is determined, by connecting the first waveguide 308 to the first planar filter part 306 at an angle thus determined depending on the wavelength range of signal light entering the first planar filter part 306 and also on the transmission spectrum of the first planar filter part 306, the transmittance for each of the polarization states can be controlled. Accordingly, it becomes possible to separate TE and TM waves from each other more precisely. It is much the same for the angle at which the fourth waveguide 311 is connected to the second planar filter part 307.

The fifth waveguide 312 is connected to the first interference part 314 and to the second planar filter part 307, and guides the local oscillator light component including the first polarization state.

Preferably, the second waveguide 309 is connected to the first planar filter part 306 at an angle determined depending on the angle at which the first waveguide 308 is connected to the first planar filter part 306. For example, the incident angle at which the first waveguide 308 is connected to the first planar filter part 306 and the reflection angle at which the second waveguide 309 is connected to the first planar filter part 306 are set to be almost the same. By this way, signal light reflected at the first planar filter part 306 is guided efficiently, and accordingly it becomes possible to prevent the signal intensity from decreasing. It is much the same for the fifth waveguide 312.

The sixth waveguide 313 is connected to the second interference part 315 and to the second planar filter part 307, and guides the local oscillator light component including the second polarization state.

Preferably, the third waveguide 310 is connected to the first planar filter part 306 at an angle determined depending on the angle at which the first waveguide 308 is connected to the first planar filter part 306 and also on the refractive index of the first planar filter part 306. More specifically, a refraction angle is calculated on the basis of the angle at which the first waveguide 308 is connected to the first planar filter part 306 and the refractive index of the first planar filter part 306. Then, the angle at which the third waveguide 310 is connected to the first planar filter part 306 is made equal to the calculated refraction angle. By this way, signal light having passed through the first planar filter part 306 can be guided efficiently, and accordingly it becomes possible to prevent the signal intensity from decreasing. It is much the same for the connection angle of the sixth waveguide 313. Here, with regard to the incident angle, the reflection angle and the refraction angle, it may be assumed that light is guided through the center of each waveguide.

Preferably, the length of the second waveguide 309 and that of the third waveguide 310 are the same. It is because the propagation distance becomes equal for signal light which interferes with local oscillator light in the first interference part 314 and signal light which interferes with local oscillator light in the second interference part 315. As a result, it is possible to reduce a skew occurring between the two signal light components and to reduce degradation of the signal quality. More preferably, the length of the fifth waveguide 312 and that of the sixth waveguide 313 are made equal.

More preferably, a light shield part for blocking light is provided between the first and second planar filter parts 306 and 307. This makes it possible to reduce crosstalk between signal light and local oscillator light.

A cause of the crosstalk will be described using a specific example, first. For example, it is assumed that signal light having entered the first planar filter part 306 from the first waveguide 308 leaks from the first planar filter part 306 and enters the second planar filter part 307. Then, the leaked signal light is guided by the fifth or sixth waveguide 312 or 313 connected to the second planar filter part 307. In this way, a crosstalk between the signal light and the local oscillator light arises. Therefore, by providing a light shield part for blocking light at the area between the first and second planar filter parts 306 and 307, entrance of light having leaked from the first planar filter part 306 into the second planar filter part 307 and also of the reverse of the above case can be suppressed. A metal block may be used as the light shield part, for example.

A description has been given above of an example of a configuration of the planar lightwave circuit 300 which is an example of the optical receiving unit 201.

Next, the operation of the planar lightwave circuit 300 shown in FIG. 3 will be described.

First, signal light modulated by polarization-multiplexed phase shift keying is inputted from the transmission line 102 into the signal light input port 304. The local oscillator light from the local oscillator light source 202 is inputted into the local oscillator light input port 305.

Then, the first waveguide 308 guides the signal light to the first planar filter part 306. On the other hand, the fourth waveguide 311 guides the local oscillator light to the second planar filter part 307.

Then, the second waveguide 309 guides a signal light component including the first polarization state. Specifically, the second waveguide 309 guides signal light reflected in the first planar filter part 306 to the first interference part 314. On the other hand, the fifth waveguide 312 guides the local oscillator light component including the first polarization state. Specifically, the fifth waveguide 312 guides the local oscillator light reflected in the second planar filter part 307 to the first interference part 314.

The third waveguide 310 guides a signal light component including the second polarization state. Specifically, the third waveguide 310 guides signal light having passed through the first planar filter part 306 to the second interference part 315. On the other hand, the sixth waveguide 313 guides the local oscillator light component including the second polarization state. Specifically, the sixth waveguide 313 guides the local oscillator light having passed through the second planar filter part 307 to the second interference part 315.

In the first interference part 314, interference occurs between the signal light component including the first polarization state, which was guided by the second waveguide 309 interferes with the local oscillator light component including the first polarization state guided by the fifth waveguide 312. On the other hand, in the second interference part 315, the signal light component including the second polarization state guided by the third waveguide 310 interferes with the local oscillator light component including the second polarization state guided by the sixth waveguide 313.

After that, interfering light beams having interfered in the first and second interference parts 314 and 315 are outputted to the photoelectric conversion unit 203, which is not illustrated in the figure. The operation of the planar lightwave circuit 300 shown in FIG. 3 has been described above.

As described above, according to the present exemplary embodiment, by forming the first interference part 314 in the substrate 301 and forming the second interference part 315 on a side of the substrate 30 opposite to the first interference part 314 across the groove 316, the waveguides connected to the first interference part 314 are isolated by the groove 316 from the waveguides connected to the second interference part 315. As a result, it becomes possible to eliminate the points where the second, third, fifth and sixth waveguides 309, 310, 312 and 313 intersect. Additionally, because the second and third waveguides 309 and 310 and the fifth and sixth waveguides 312 and 313 can be simplified, reduction of a skew occurring between signal light and local oscillator light can be easily achieved.

As described above, to form the groove 316 in the substrate 301, a dicing process needs to be performed. By means of the dicing process, there is no choice but to form the groove from one end to the other end of the substrate. Accordingly, in the configuration described in Patent Literature 1, for example, there is a problem that by the dicing process waveguides are undesirably cut. In contrast, according to the present exemplary embodiment, the waveguides connected to the first interference part 314 is isolated by the groove 316 from the waveguides connected to the second interference part 315. Accordingly, there is no waveguide in an area where the dicing process is performed. As a result, it becomes possible to reduce unnecessary cutting of the waveguides by the dicing process.

Next, a description will be given of a modified example of the planar lightwave circuit 300 shown in FIG. 3, which is an example of the optical receiving unit 201.

Figure 4:
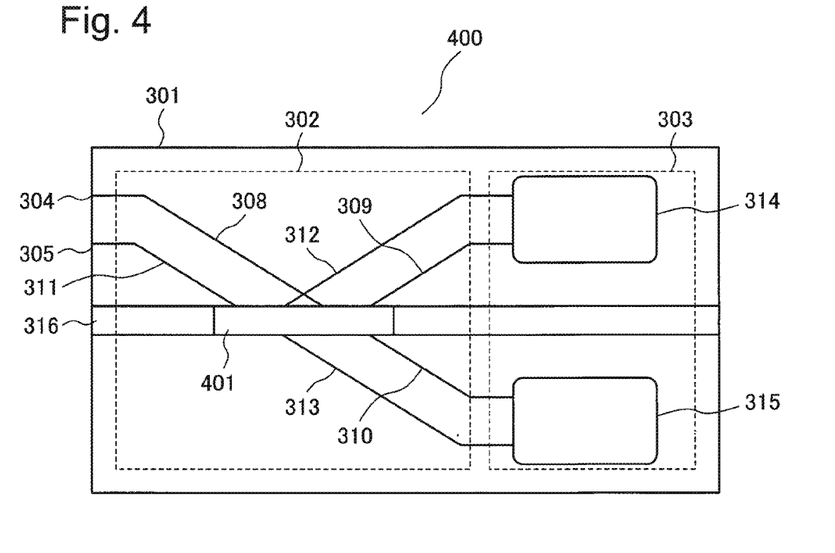
FIG. 4 is a modified example of the planar lightwave circuit according to the exemplary embodiment of the present invention.

FIG. 4 shows the modified example of the planar lightwave circuit 300 shown in FIG. 3, which is an example of the optical receiving unit 201. To the same configurations as those in the planar lightwave circuit 300 shown in FIG. 3, the same signs are used, and their descriptions will be omitted for simplification.

The planar lightwave circuit 400 is different from the planar lightwave circuit 300 in that it includes a planar filter part 401. The planar filter part 401 is fitted into the groove 316, and separates signal light into a signal light component including the first polarization and that including the second polarization. Additionally, the planar filter part 401 separates local oscillator light into a local oscillator light component including the first polarization and that including the second polarization. That is, the first and second planar filter parts 306 and 307 are integrated.

Thus, by integrating the first and second planar filter parts 306 and 307, and including the planar filter part 401, the number of parts can be reduced.

Preferably, in the vicinity of a point at which the first or fourth waveguide 308 or 311 is connected to the planar filter part 401, the first or fourth waveguide 308 or 311 is shaped to be tapering or broadening towards its end. As a result, the diffraction angle of signal light or local oscillator light entering the planar filter part 401 can be made smaller. Accordingly, it becomes possible to reduce leakage of signal light entering the planar filter part 401 to the fifth or sixth waveguide 312 or 313, for example.

Figure 5:
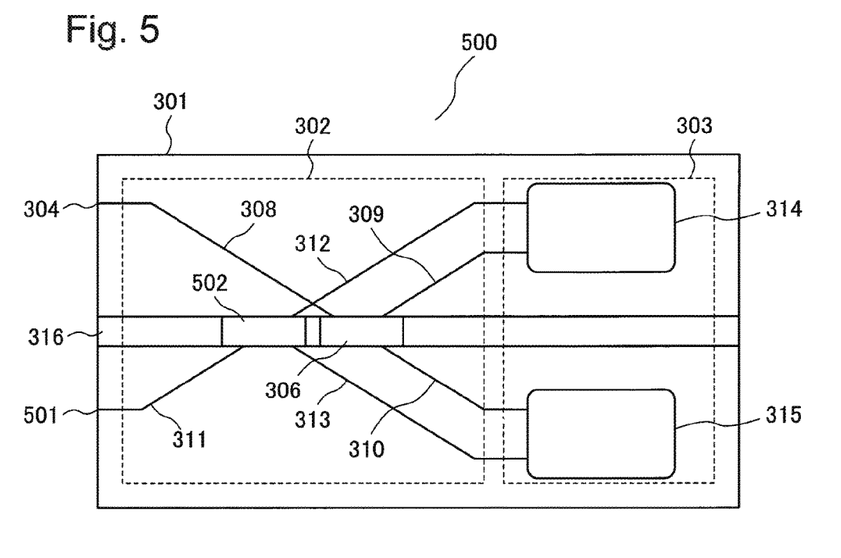
FIG. 5 is another modified example of the planar lightwave circuit according to the exemplary embodiment of the present invention.

Further, a description will be given of another modified example of the planar lightwave circuit 300, which is an example of the optical receiving unit 201. FIG. 5 shows the another modified example of the planar lightwave circuit 300, which is an example of the optical receiving unit 201. For the same configurations as those in the planar lightwave circuit 300 shown in FIG. 3, the same signs are used, and their descriptions will be omitted for simplification.

The planar lightwave circuit 500 is different from the planar lightwave circuit 300 in that a local oscillator light input port 501 is provided on a side of the substrate 301 opposite to the signal light input port 304 across the groove 316.

Additionally, a second planar filter part 502 has the inverse characteristics to those of the first planar filter part 306. The relation between the characteristics of the second planar filter part 502 and those of the first planar filter part 306 will be described below using an example. For example, it is assumed that the first planar filter part 306 reflects the signal light component including the first polarization and transmits that including the second polarization. In that case, the second planar filter part 502 transmits the signal light component including the first polarization and reflects that including the second polarization. The relation in characteristics between the first and second planar filter parts 306 and 502 may be reversed.

Next, the materials of the first and second planar filter parts 306 and 502 will be described. For example, it is assumed that the first polarization state is equivalent to a TM wave, and the second polarization state to a TE wave. In that case, a dielectric multilayer filter and a photonic crystal polarizer may be used for the first planar filter part 306. However, for the second planar filter part 502, a dielectric multilayer filter cannot be used, and a photonic crystal polarizer, for example, needs to be used. This is because a dielectric multilayer filter has characteristics of reflecting light including mainly a TM wave and of transmitting light including mainly a TE wave, and cannot have reverse characteristics.

A photonic crystal polarizer may be used for both of the first and second planar filter parts 306 and 502. In that case, the second planar filter part 502 having reverse characteristics to those of the first planar filter part 306 can be realized by rotating the first planar filter part 306 by 90 degrees around its optical axis, for example.

By providing the local oscillator light input port 501 on a side of the substrate 301 opposite to the signal light input port 304 across the groove 316, as described above, the signal light input port 304 and the local oscillator light input port 501 can be separated from each other. As a result, because a spatial margin arises around the signal light input port 304 and the local oscillator light input port 502, working efficiency of a worker can be improved.

Figure 6:
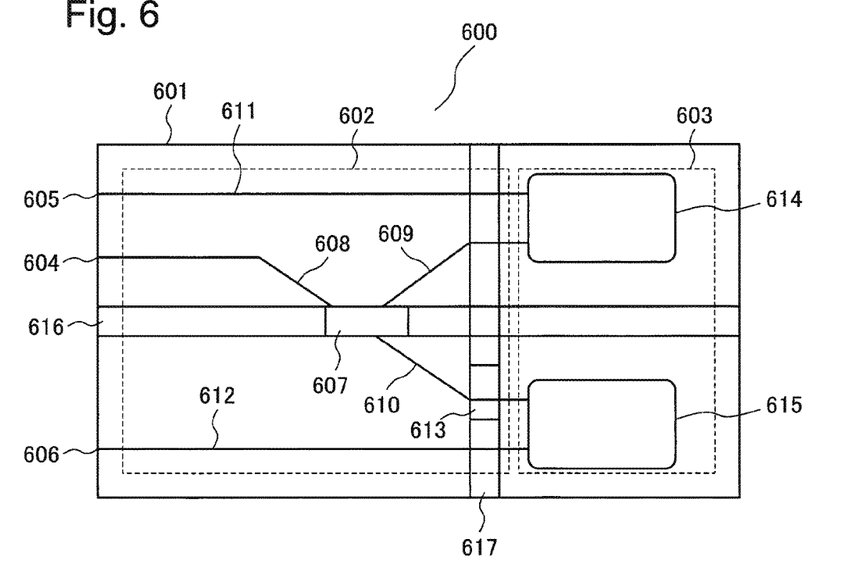
FIG. 6 is an example of a configuration of the planar lightwave circuit according to another exemplary embodiment of the present invention.

Next, another exemplary embodiment of the present invention will be described with reference to figures. The following description will be given of a configuration of a planar lightwave circuit according to the another exemplary embodiment, which is an example of the optical receiving unit 201, using figures. FIG. 6 is a configuration of a planar lightwave circuit 600, which is an example of the optical receiving unit 201.

The planar lightwave circuit 600 includes a substrate 601, a polarization separation section 602, an interference section 603, a signal light input port 604, and a first and a second local oscillator light input port 605 and 606.

Further, the polarization separation section 602 includes a planar filter part 607, first to fifth waveguides 608, 609, 610, 611 and 612, and a polarization switching part 613. The interference section 603 includes a first and a second interference part 614 and 615. The signal light input port 605, the first to third waveguides 608, 609 and 610, and the first and second interference parts 614 and 615 are the same as those in the exemplary embodiment described above, and accordingly their descriptions are omitted.

A straight groove 616 is formed in the substrate 601. Preferably, a groove 617 intersecting perpendicularly with the groove 616 is formed in the substrate 601. As shown in FIG. 6, for example, the groove 617 may be formed linearly from one end of the substrate 601 to the other end. The groove 617 may also be formed in a portion of the substrate 601, and it is only necessary to have an enough size to fit the polarization switching part 613 into it.

The first and second local oscillator light input ports 605 and 606 are formed in the substrate 601 and receive local oscillator light with a single polarization state. Preferably, the second local oscillator light input port 606 is provided on a side of the substrate 601 opposite to the first local oscillator light input port 605 across the groove 616. Accordingly, the first and second local oscillator light input ports 605 and 606 can be separated from each other. As a result, because a spatial margin arises around the first and second local oscillator light input ports 605, working efficiency of a worker can be improved. Here, the local oscillator light with a single polarization state means local oscillator light including mainly one of the two polarization states. That is, it does not mean that the local oscillator light includes none of the other polarization state.

The planar filter part 607 is fitted into the groove 616, and separates signal light into a signal light component including the first polarization state and that including the second polarization state. The characteristics, shape, surfaces and the like of the planar filter part 607 are the same as those of the first and second planar filter parts 306 and 307 in the above-described exemplary embodiment. For the planar filter part 607, a dielectric multilayer filter and a photonic crystal polarizer can be employed.

The fourth waveguide 611 is connected to the first local oscillator light input port 605 and to the first interference part 614, and guides the local oscillator light including the first polarization state. The fifth waveguide 612 is connected to the second local oscillator light input port 606 and to the second interference part 615, and guides the local oscillator light including the first polarization state.

The polarization switching part 613 is provided in one of the third and fifth waveguides 610 and 612, and switches the polarization state of incident light. Preferably, the polarization switching part 613 is fitted into the groove 617.

A function of the polarization switching part 613 will be described below using a specific example. For example, it is assumed that light including the first polarization state enters the polarization switching part 613. The polarization switching part 613 changes the polarization state of the light into the second polarization state and outputs the light after the changing. On the other hand, when the light including the second polarization state enters the polarization switching part 613, it outputs the light including the first polarization state. The polarization switching part 613 described above can be realized by a half-wave plate or the like.

Preferably, the polarization switching part 613 is provided in the third waveguide 610. That is, it is desirable to provide the polarization switching part 610 in a waveguide which guides the signal light component including the second polarization state. By this way, the polarizations of light beams inputted into respectively the first and second interference parts 614 and 615 can be made the same. As a result, even when there is an individual difference in characteristics between the first and second interference parts 614 and 615 due to the polarization of light, influence of the individual difference can be reduced. The polarization switching part 613 may also be provided in the second waveguide 609.

A configuration of the planar lightwave circuit 600, which is an example of the optical receiving unit 201, has been described above.

Next, the operation of the planar lightwave circuit 600 shown in FIG. 6 will be described. The present description will be given as an example of a case where the polarization switching part 613 is provided in the third waveguide 610 and the single polarization state is the first polarization state.

First, signal light modulated by polarization-multiplexed phase shift keying is inputted from the transmission line 102 into the signal light input port 604. Local oscillator light including the first polarization state outputted from the local oscillator light source 202 is inputted into the first and second local oscillator light input ports 605 and 606.

Then, the first waveguide 608 guides the signal light to the planar filter part 607.

Then, the second waveguide 609 guides a signal light component including the first polarization state. Specifically, it guides the signal light reflected in the planar filter part 607 to the first interference part 614. On the other hand, the third waveguide 610 guides a signal light component including the second polarization state. Specifically, it guides the signal light having passed through the planar filter part 607 to the second interference part 615.

At this stage, the polarization switching part 613 changes the signal light component including the second polarization state guided by the third waveguide 610 to that including the first polarization state.

The fourth waveguide 611 guides the local oscillator light having the first polarization state to the first interference part 614. On the other hand, the fifth waveguide 612 guides the local oscillator light having the first polarization state to the second interference part 615.

The first interference part 614 makes the signal light component including the first polarization state guided by the second waveguide 609 interfere with the local oscillator light including the first polarization state guided by the fourth waveguide 611. The second interference part 615 makes the signal light component including the first polarization state having been changed by the polarization switching part 613 and guided by the second waveguide 609 interfere with the local oscillator light including the first polarization state guided by the fifth waveguide 612.

After that, interference light beams made interfere with each other in the first and second interference part 614 and 615 are outputted to a photoelectric conversion unit, which is not illustrated in the drawing. The operation of the planar lightwave circuit 600 shown in FIG. 6 has been described above.

As described above, according to another exemplary embodiment, by including the polarization switching part 613 which is provided in one of the third and fifth waveguides 610 and 612 and changes the polarization of incident light, it becomes possible to make the local oscillator light beams inputting into the first and second local oscillator light input port 605 and 606 have a single polarization state. As a result, it becomes unnecessary, for the purpose of inputting polarization-multiplexed local oscillator light into the local oscillator light input ports, to control the polarization plane of local oscillator light inputting into the local oscillator light input ports. Accordingly, it is possible to reduce light intensity difference between the polarizations which is caused by discrepancy, from a reference, of the polarization plane of local oscillator light inputting into the local oscillator light input ports.

Figure 7:
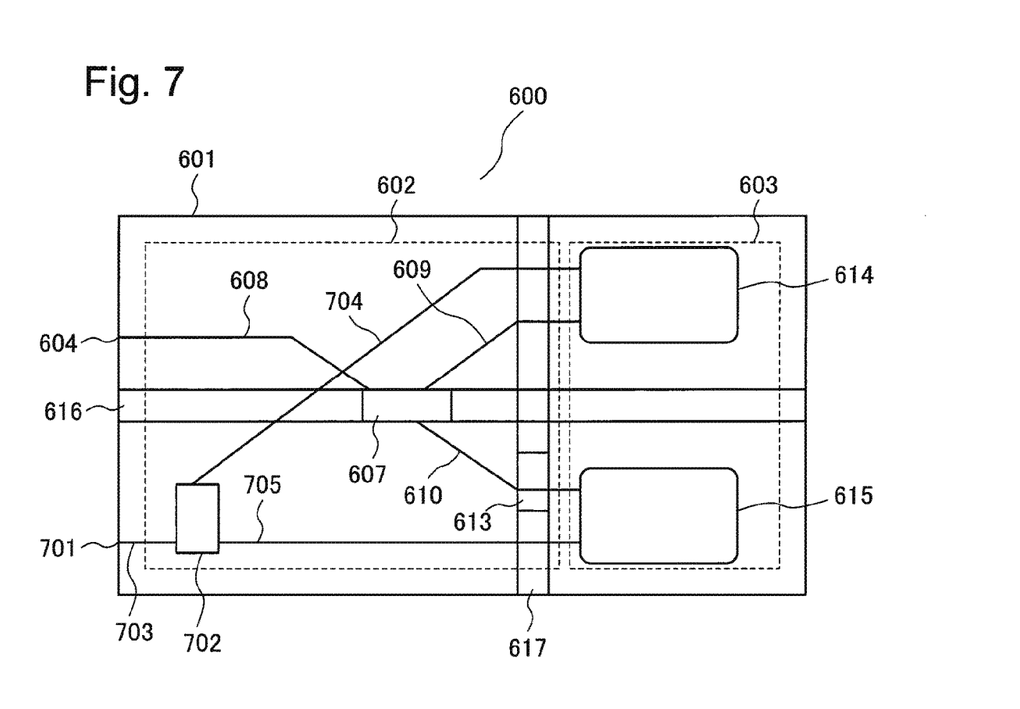
FIG. 7 is a modified example of the planar lightwave circuit according to the another exemplary embodiment of the present invention.

Next, a description will be given of a modified example of the planar lightwave circuit 600 shown in FIG. 6, which is an example of the optical receiving unit 201. FIG. 7 shows the modified example of the planar lightwave circuit 600, which is an example of the optical receiving unit 201. For the same configurations as those in the planar lightwave circuit 600 shown in FIG. 6, the same signs are used, and their descriptions will be omitted for simplification.

The planar lightwave circuit 700 includes a local oscillator light input port 701, a splitting part 702, and fourth to sixth waveguides 703, 704 and 705.

The local oscillator light input port 701 is formed in the substrate 601 and receives inputted local oscillator light with a single polarization state. The local oscillator light input port 701 is connected to the fourth waveguide 703.

The splitting part 702 splits inputted light. The splitting part 702 is connected to the fourth to sixth waveguides 703, 704 and 705. And it splits the single-polarization local oscillator light inputted from the fourth waveguide 703, and outputs the split components of the single-polarization local oscillator light to the fifth and sixth waveguides 704 and 705.

The fifth waveguide 704 is connected to the splitting part 702 and to the first interference part 614, and guides the single-polarization local oscillator light. The sixth waveguide 705 is connected to the splitting part 702 and to the second interference part 615, and guides the single-polarization local oscillator light.

By thus including the splitting part 702 for splitting inputted light and the fourth to sixth waveguide 703, 704 and 705, it becomes possible to bring local oscillator light input port 701 into one.

Although the present invention has been described above with reference to the exemplary embodiments, but the present invention is not limited to the above-described exemplary embodiments. To the configurations and details of the present invention, various changes and modifications which can be understood by those skilled in the art may be made within the scope of the present invention.

This application is based upon and claims the benefit of priority from Japanese Patent Application No. 2011-214483, filed on Sep. 29, 2011, the disclosure of which is incorporated herein in its entirety by reference.

INDUSTRIAL APPLICABILITY

The present invention can be applied to, for example, a planar lightwave circuit and an optical receiver which receive a polarization-multiplexed optical signal.

DESCRIPTION OF THE CODES 100 optical transmission system
101 optical transmitter
102 transmission line
103, 200, 900 optical receiver
201 optical receiving unit
202, 902 local oscillator light source
203 photoelectric conversion unit
204 analog-to-digital converter
205 digital signal processing unit
206 demodulation unit
208, 303, 603 interference part
300, 400, 500, 600, 700 planar lightwave circuit
301, 601 substrate
304, 604 signal light input port
305, 501, 701 local oscillator light input port
605 first local oscillator light input port
606 second local oscillator light input port
306 first planar filter part
307, 502 second planar filter part
308, 608 first waveguide
309, 609 second waveguide
310, 610 third waveguide
311, 611, 703 fourth waveguide
312, 612, 704 fifth waveguide
313, 705 sixth waveguide
613 polarization switching part
314, 614 first interference part
315, 615 second interference part
316, 616, 617 groove
207, 302, 602 polarization separation section
903 90-degree optical hybrid
904 photoelectric conversion unit
905 analog-to-digital converter
906 digital signal processing unit
907 symbol discrimination unit
702 splitting part

The invention claimed is:

1. A planar lightwave circuit, comprising:
a substrate with a straight groove being formed therein;
a signal light input port formed in said substrate and receiving polarization-multiplexed signal light;
a local oscillator light input port formed in said substrate and receiving polarization-multiplexed local oscillator light;
a first planar filter part fitted into said groove and separating said signal light into a signal light component comprising a first polarization state and a signal light component comprising a second polarization state;
a second planar filter part fitted into said groove and separating said local oscillator light into a local oscillator light component comprising the first polarization state and a local oscillator light component comprising the second polarization state;
a first interference part formed in said substrate;
a second interference part formed on a side of said substrate opposite to the side of said first interference part across the groove;
a first waveguide connected to said signal light input port and connected diagonally to a reflection surface of said first planar filter part;
a second waveguide connected to said first interference part and to said first planar filter part, and guiding said signal light component comprising the first polarization state;
a third waveguide connected to said second interference part and to said first planar filter part, and guiding said signal light component comprising the second polarization state;
a fourth waveguide connected to said local oscillator light input port and also connected diagonally to a reflection surface of said second planar filter part;
a fifth waveguide connected to said first interference part and to said second planar filter part, and guiding said local oscillator light component comprising the first polarization state; and
a sixth waveguide connected to said second interference part and to said second planar filter part, and guiding said local oscillator light component comprising the second polarization state.

2. The planar lightwave circuit according to claim 1, further comprising a light shield part for blocking light between said first and second planar filter parts.

3. The planar lightwave circuit according to claim 1, wherein said local oscillator light input port is provided on a side of said substrate opposite to the side of said signal light input port across said groove.

4. The planar lightwave circuit according to claim 1, wherein said first and second planar filter parts are integrated.

5. The planar lightwave circuit according to claim 1 wherein the length of said second waveguide and is the same as the length of said third waveguide.

6. The planar lightwave circuit according to claim 1 wherein the length of said fifth waveguide is the same as the length of said sixth waveguide.

7. The planar lightwave circuit according to claim 1 wherein said first waveguide is connected to said first planar filter part at an angle determined depending on the wavelength range of said signal light entering said first planar filter part.

8. The planar lightwave circuit according claim 1, wherein each of said first and second interference parts is a 90-degree optical hybrid.

9. The planar lightwave circuit according to claim 1, wherein said groove is formed linearly from one end to the other end of said substrate.

10. An optical receiver, comprising:
- a planar lightwave circuit separating polarization-multiplexed signal light in terms of polarization and making polarization-separated signal light components to interfere with local oscillator light;
- a photoelectric conversion unit converting interference light outputted from said planar lightwave circuit into an electrical signal;
- an analog-to-digital conversion unit converting said electrical signal into a digital signal; and
- a digital signal processing unit processing the digital signal; wherein said planar lightwave circuit comprises:
- a substrate with a straight groove being formed therein;
- a signal light input port formed in said substrate and receiving polarization-multiplexed signal light;
- a local oscillator light input port formed in said substrate and receiving polarization-multiplexed local oscillator light;
- a first planar filter part fitted into said groove and separating said signal light into a signal light component comprising a first polarization state and a signal light component comprising a second polarization state;
- a second planar filter part fitted into said groove and separating said local oscillator light into a local oscillator light component comprising the first polarization state and a local oscillator light component comprising the second polarization state;
- a first interference part formed in said substrate;
- a second interference part formed on a side of said substrate opposite to the side of the first interference part across the groove;
- a first waveguide connected to said signal light input port and connected diagonally to a reflection surface of said first planar filter part;
- a second waveguide connected to said first interference part and to said first planar filter part, and guiding said signal light component comprising the first polarization state;
- a third waveguide connected to said second interference part and to said first planar filter part, and guiding said signal light component comprising the second polarization state;
- a fourth waveguide connected to said local oscillator light input port and connected diagonally to a reflection surface of said second planar filter part;
- a fifth waveguide connected to said first interference part and to said second planar filter part, and guiding said local oscillator light component comprising the first polarization state; and
- a sixth waveguide connected to said second interference part and to said second planar filter part, and guiding said local oscillator light component comprising the second polarization state.

* * * * *